Patented July 16, 1929.

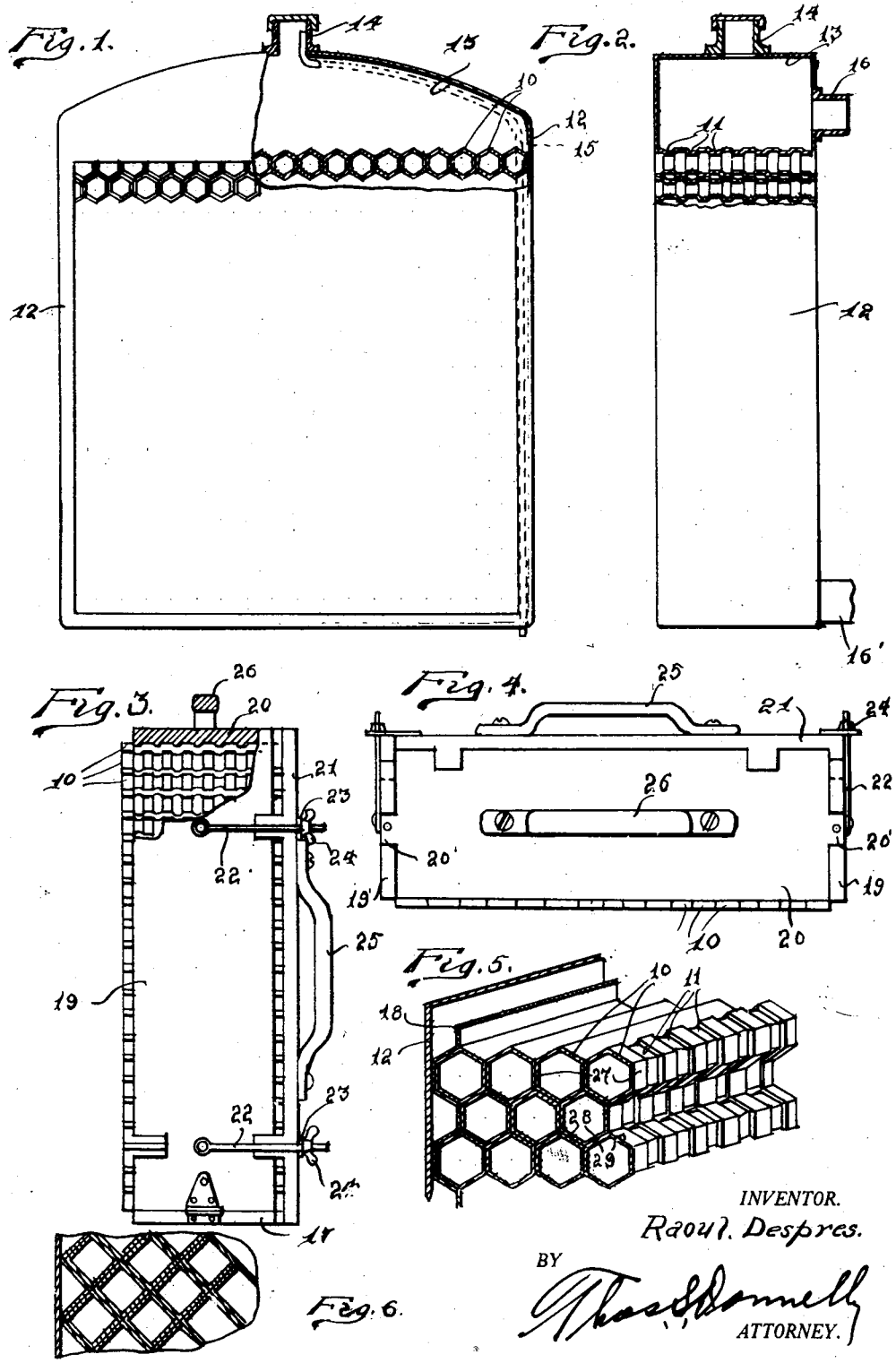

1,720,669

UNITED STATES PATENT OFFICE.

RAOUL DESPRES, OF DETROIT, MICHIGAN.

RADIATOR CORE.

Application filed December 13, 1926. Serial No. 154,417.

My invention relates to a new and useful improvement in a radiator core, and has for its object the provision of a radiator core adapted for use in connection with water cooled internal combustion engines, so arranged and constructed as to afford a maximum area of cooling surface, while at the same time, providing sufficient volume for containing water.

It is another object of the present invention to provide a radiator core in which a plurality of vertically extending columns of water may be connected by transversely extending passages.

Other objects will appear hereinafter.

The invention consists in the combination and arrangement of parts hereinafter described and claimed.

The invention will be best understood by a reference to the accompanying drawings which form a part of this specification and in which, Fig. 1 is a front elevational view of a radiator involving the invention with a part broken away.

Fig. 2 is a side elevational view of a radiator involving the invention with a part broken away.

Fig. 3 is a side elevational view of the tubes mounted in the holder with a part broken away.

Fig. 4 is a top plan view of Fig. 3.

Fig. 5 is a fragmentary perspective view of a radiator embodying the invention.

Fig. 6 is a fragmentary front elevational view of a modified form of the invention.

As shown in the drawings, the radiator core proper is made from a plurality of separable tubes 10 having peripheral grooves 11 formed at spaced intervals throughout their length. In the form shown in Fig. 5, these tubes are formed hexagonal, this being the preferred form as it is believed to effect the maximum efficiency in operation. The radiator core is placed in the usual radiator shell 12 having the reservoir 13 at the upper end thereof communicating with the filling spout 14 in which projects the overflow pipe 15. The conduit 16 forms a return connection with the engine, while the conduit 16' forms the delivery connection with the engine, these connections being well known to those skilled in the art. The sides of the core are sealed by a suitable sealing plate 18 which is extended along each side of the core so that the water flowing into the vertically extending passages is confined therein. In assembly, the tubes are placed upon each other, as shown in Fig. 5, the side faces 27 abutting against each other, so that the vertically extending portion of the groove 11 will form the vertically extending tubes. On account of the transversely extending portions of the groove the vertically extending tubes or passages at opposite sides of the tubes 10 will be in communication with each other, thus having tubes of water extending around the entire periphery of the tubes 10. The lower faces 28 engage the upper faces 29 so that a sealing of these passages individually along the length of the tube is effected. The sealing plate 18 may be welded or otherwise secured to the side tubes, and it will be noted that the sealing plate is so arranged that it is curved to form a half portion of the tube with which it engages, so that the tube rests in the channels formed in the sealing plate 18.

When the tubes are assembled in loose position for forming the core, the ends are secured together by dipping in solder and for this purpose I have provided a holder whereby the tubes may be easily and quickly dipped in solder and retained in position until the solder has hardened. This holder comprises a base 17 upon which is hingedly mounted at one end side walls 19 and 19'. A top 20 is mounted on the side walls 19 and provided with overlapping lugs 20' at each end through which a screw may be projected into the side walls 19 and 19', so as to bind these side walls in position. A rear wall 21 is secured to the side walls by means of swingably mounted bolts 22 which are adapted to engage in lugs 23 mounted on the rear wall 21, suitable wing nuts 24 being provided to lock the rear wall 21 on the side walls. A handle 25 is mounted on the rear wall 21, and a similar handle 26 is mounted on the top wall 20. As shown in Fig. 3, when the tubes are mounted in this holder, they project slightly from the forward end thereof, so that the operator may dip the ends of the tubes in the solder. The rear wall 21 may then be removed after the solder has hardened, and the bolts 22 swung on their pivot to extend in the opposite direction while the rear wall 21 may be mounted on the reverse side, and the opposite ends of the tubes dipped in solder, these tubes being of greater length than the width of the side walls 19, as shown in Fig. 3. This arrangement is one which permits a binding of the tubes by the side walls 19 and 19', the bottom wall 17 and the top wall 20, so that they are held in secure position by these walls, thus permitting a removal and replacement of the wall 21 as desired. In this way the ends may be very easily and quickly dipped with the assurance that a disturbance of the tubes will not be effected while reversing the ends for dipping.

A radiator core constructed in the manner described, on account of the large area at which the water is exposed to the cooling influence of the air passing through the tubes 10, is one which is most efficient, while at the same time it provides a radiator which is cheaply manufactured and durable in use.

While I have illustrated and described the preferred form of construction, I do not wish to limit myself to the precise form of structure shown, but desire to avail myself of such variations and modifications as may come within the scope of the appended claims.

Having thus described my invention what I claim as new and desire to secure by Letters Patent is:

1. A radiator core of the class described comprising: a plurality of tubes, each of said tubes having peripheral grooves extending completely around the tube and formed therein at spaced intervals thereon, said tubes engaging each other and sealing the passages formed by aligning grooves from similar passages formed by adjacent grooves axially of the tubes; and sealing plates for engaging the sides of the core formed for closing the peripheral grooves at said sides.

2. A radiator core of the class described comprising: a plurality of tubes, each of said tubes having peripheral grooves extending completely around the tube and formed therein at spaced intervals thereon, said tubes engaging each other and sealing the passages formed by aligning grooves from similar passages formed by adjacent grooves axially of the tubes; and sealing plates having channels formed therein to conform to the contour of the channels of said tubes and secured to the sides of the core comprised by said tubes, said sealing plates effecting a sealing of said peripheral grooves at said sides.

In testimony whereof I have signed the foregoing.

RAOUL DESPRES.